US008286802B2

(12) United States Patent
Leppert

(10) Patent No.: US 8,286,802 B2
(45) Date of Patent: *Oct. 16, 2012

(54) IN-TANK FUEL DELIVERY MODULE HAVING AN ACCESSIBLE FUEL FILTER

(75) Inventor: Kevin L. Leppert, Lanexa, VA (US)

(73) Assignee: Synerject, LLC, Newport News, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/326,704

(22) Filed: Dec. 15, 2011

(65) Prior Publication Data

US 2012/0080367 A1    Apr. 5, 2012

Related U.S. Application Data

(63) Continuation of application No. 12/351,993, filed on Jan. 12, 2009, now Pat. No. 8,079,479.

(60) Provisional application No. 61/022,079, filed on Jan. 18, 2008.

(51) Int. Cl.
*B01D 35/027* (2006.01)
*B01D 27/08* (2006.01)
*B01D 27/10* (2006.01)
*F02M 37/10* (2006.01)
*F02M 37/08* (2006.01)
*B01D 27/00* (2006.01)

(52) U.S. Cl. ........... 210/416.4; 210/172.1; 210/172.6; 210/172.2; 210/416.5; 210/422; 123/511; 123/514; 123/510

(58) Field of Classification Search ............... 210/416.4
See application file for complete search history.

(56) References Cited

U.S. PATENT DOCUMENTS

| 3,507,263 A | 4/1970 | Long |
| 4,860,714 A | 8/1989 | Bucci |
| 5,070,849 A | 12/1991 | Rich et al. |
| 5,080,077 A | 1/1992 | Sawert et al. |
| 5,289,810 A | 3/1994 | Bauer et al. |
| 5,341,842 A | 8/1994 | Chih et al. |

(Continued)

FOREIGN PATENT DOCUMENTS

CN    2916171 Y    6/2007

(Continued)

OTHER PUBLICATIONS

International Search Report and Written Opinion for PCT/US2009/030808, mailed Mar. 11, 2009.

(Continued)

*Primary Examiner* — Krishnan S Menon
(74) *Attorney, Agent, or Firm* — Cooley LLP

(57) ABSTRACT

A fuel delivery module includes a fuel filter housing and a cover. The fuel filter housing defines a cavity configured to receive at least a portion of a fuel filter. A first end portion of the fuel filter housing includes a flange configured to be disposed outside of and coupled to a fuel tank. A second end portion of the fuel filter housing is configured to be disposed within the fuel tank and includes an inlet connector configured to fluidically couple the cavity to a fuel pump. The cover is configured to be removably coupled to the first end portion of the fuel filter housing. The cover defines a first lumen and a second lumen. The first lumen is configured to fluidically couple the cavity to a fuel outlet line. The second lumen is configured to fluidically couple the cavity to a regulator.

20 Claims, 11 Drawing Sheets

U.S. PATENT DOCUMENTS

| | | | |
|---|---|---|---|
| 5,361,742 A | 11/1994 | Briggs et al. |
| 5,389,245 A | 2/1995 | Jaeger et al. |
| 5,415,146 A | 5/1995 | Tuckey |
| 5,452,701 A | 9/1995 | Tuckey |
| 5,458,767 A | 10/1995 | Stone |
| 5,469,829 A | 11/1995 | Kleppner et al. |
| 5,520,156 A | 5/1996 | Brunnhofer |
| 5,649,514 A | 7/1997 | Okada et al. |
| 5,655,504 A | 8/1997 | Iwai |
| 5,715,798 A | 2/1998 | Bacon et al. |
| 5,718,208 A | 2/1998 | Brautigan et al. |
| 5,727,529 A | 3/1998 | Tuckey |
| 5,743,239 A | 4/1998 | Iwase |
| 5,791,317 A | 8/1998 | Eck |
| 5,960,775 A | 10/1999 | Tuckey |
| 6,123,521 A | 9/2000 | Mori et al. |
| 6,142,126 A | 11/2000 | Kanamaru |
| 6,155,793 A | 12/2000 | Tuckey et al. |
| 6,213,143 B1 | 4/2001 | Schwegler et al. |
| 6,213,726 B1 | 4/2001 | Tuckey |
| 6,220,454 B1 | 4/2001 | Chilton |
| 6,241,883 B1 | 6/2001 | Noda |
| 6,253,735 B1 | 7/2001 | Miyajima |
| 6,260,543 B1 | 7/2001 | Chih |
| 6,293,770 B1 | 9/2001 | Matsumoto et al. |
| 6,311,725 B1 | 11/2001 | Hamada et al. |
| 6,343,589 B1 | 2/2002 | Talaski et al. |
| 6,424,924 B1 | 7/2002 | Wagner et al. |
| 6,439,205 B2 | 8/2002 | Ushigome |
| 6,457,458 B1 | 10/2002 | Frank et al. |
| 6,488,476 B2 | 12/2002 | Eck |
| 6,491,029 B2 | 12/2002 | Kondou et al. |
| 6,520,163 B2 | 2/2003 | Yoshioka et al. |
| 6,729,309 B2 | 5/2004 | Schueler |
| 6,733,249 B2 | 5/2004 | Maier et al. |
| 6,928,989 B2 | 8/2005 | Powell |
| 6,981,490 B2 | 1/2006 | Nagata et al. |
| 7,069,912 B2 | 7/2006 | Yoshioka |
| 7,146,968 B2 | 12/2006 | Koito et al. |
| 7,617,814 B2 | 11/2009 | Leppert |
| 7,677,225 B2 | 3/2010 | Radue et al. |
| 7,775,235 B2 | 8/2010 | Leppert et al. |
| 8,079,479 B2 | 12/2011 | Leppert |
| 2002/0152996 A1 | 10/2002 | Gabauer et al. |
| 2003/0000502 A1 | 1/2003 | Jones et al. |
| 2003/0024509 A1 | 2/2003 | Matusek et al. |
| 2003/0127075 A1 | 7/2003 | Braun et al. |
| 2003/0131828 A1 | 7/2003 | Crary |
| 2004/0000344 A1 | 1/2004 | Okabe et al. |
| 2004/0173187 A1 | 9/2004 | Kanamaru et al. |
| 2005/0178853 A1 | 8/2005 | Doble et al. |
| 2006/0021603 A1 | 2/2006 | Nagata |
| 2006/0024176 A1 | 2/2006 | Ikeya |
| 2006/0070941 A1 | 4/2006 | Cline et al. |
| 2006/0096582 A1 | 5/2006 | Powell et al. |
| 2006/0130815 A1 | 6/2006 | Gaffield et al. |
| 2006/0231079 A1 | 10/2006 | Paluszewski |
| 2007/0074770 A1 | 4/2007 | Witherspoon et al. |
| 2007/0113830 A1 | 5/2007 | Koito et al. |
| 2007/0128049 A1 | 6/2007 | Sanchez et al. |
| 2008/0295898 A1 | 12/2008 | Leppert et al. |
| 2009/0184044 A1 | 7/2009 | Leppert |
| 2009/0223492 A1 | 9/2009 | Leppert |
| 2010/0047090 A1 | 2/2010 | Marx et al. |
| 2011/0200472 A1 | 8/2011 | Leppert et al. |

FOREIGN PATENT DOCUMENTS

| | | |
|---|---|---|
| DE | 198 24 246 A1 | 12/1998 |
| DE | 100 28 458 A1 | 12/2001 |
| DE | 103 28 206 A1 | 1/2005 |
| DE | 20 2006 010 856 U1 | 3/2008 |
| EP | 1 508 688 A1 | 2/2005 |
| GB | 2 328 659 A | 3/1999 |
| JP | 2005-256741 A | 9/2005 |

OTHER PUBLICATIONS

European Search Report for Application No. 11153284.2, mailed Aug. 24, 2011.

IN-TANK FUEL DELIVERY MODULE HAVING AN ACCESSIBLE FUEL FILTER

CROSS-REFERENCE TO RELATED APPLICATIONS

This application is a continuation of U.S. patent application Ser. No. 12/351,993, entitled "In-Tank Fuel Delivery Module Having an Accessible Fuel Filter," filed Jan. 12, 2009, which claims priority to U.S. Provisional Application Ser. No. 61/022,079, entitled "In-Tank Fuel Delivery Module Having Accessible Fuel Filter," filed Jan. 18, 2008, each of which is incorporated herein by reference in its entirety.

BACKGROUND

The embodiments described herein relate to fuel system components, and more particularly, to apparatus and methods for filtering fuel within a fuel delivery module.

Some known fuel systems utilize a high pressure fuel pump mounted within the fuel tank of a vehicle. Some known fuel systems include a fuel delivery module, which is an integrated package of related fuel system components that can be mounted within the fuel tank. Such known fuel delivery modules can include, for example, the fuel pump, a fuel pressure regulator, a fuel filter, and/or a fuel level sensor. In some arrangements, the fuel delivery module must be removed from the fuel tank to service and/or replace one of the fuel system components (e.g., the fuel filter). In some arrangements, removal of the fuel delivery module and/or a portion of the fuel delivery module can cause one or more fuel flow paths to be disconnected. For example, in some known fuel systems, replacement of the fuel filter can be accomplished only by disconnecting the flow path from the fuel pump to the fuel filter. The removal of the fuel delivery module from the fuel tank and/or the disconnection of fuel flow paths can result in increased service times (and costs), an increased risk of potential leaks when the fuel system is reassembled and/or the use of additional parts (e.g., seals).

Additionally, some known fuel delivery modules require a customized fuel filter to accommodate the packaging of various components of the fuel delivery module. The use of specific and/or customized filters can increase manufacturing cost and limit available options for servicing the fuel delivery module.

Thus, a need exists for improved apparatus and methods for filtering fuel in a fuel delivery module. A need also exists for apparatus and methods for servicing a fuel filter without requiring the removal of the fuel delivery module from the fuel tank.

SUMMARY

Fuel delivery modules are described herein. In some embodiments, a fuel delivery module includes a fuel filter housing and a cover. The fuel filter housing defines a cavity configured to receive at least a portion of a fuel filter. A first end portion of the fuel filter housing includes a flange configured to be disposed outside of and coupled to a fuel tank. A second end portion of the fuel filter housing is configured to be disposed within the fuel tank and includes an inlet connector configured to fluidically couple the cavity to a fuel pump. The cover is configured to be removably coupled to the first end portion of the fuel filter housing. The cover defines a first lumen and a second lumen. The first lumen is configured to fluidically couple the cavity to a fuel outlet line. The second lumen is configured to fluidically couple the cavity to a regulator.

DETAILED DESCRIPTION

Fuel delivery modules having improved fuel filtering and accessibility are described herein. In some embodiments, a fuel delivery module includes a fuel filter housing and a cover. The fuel filter housing defines a cavity configured to receive at least a portion of a fuel filter. A first end portion of the fuel filter housing includes a flange configured to be disposed outside of and coupled to a fuel tank. A second end portion of the fuel filter housing is configured to be disposed within the fuel tank and includes an inlet connector configured to fluidically couple the cavity to a fuel pump. The cover is configured to be removably coupled to the first end portion of the fuel filter housing. The cover defines a first lumen and a second lumen. The first lumen is configured to fluidically couple the cavity to a fuel outlet line. The second lumen is configured to fluidically couple the cavity to a regulator.

In some embodiments, a fuel delivery module includes a fuel filter housing having a first end portion and a second end portion. The first end portion of the fuel filter housing includes a flange configured to be disposed outside of and coupled to a fuel tank. The second end portion of the fuel filter housing is configured to be disposed within the fuel tank. The fuel filter housing defines a cavity configured to receive at least a portion of a fuel filter. A first surface of the fuel filter housing, which is disposed at the first end portion of the fuel filter housing, forms a first boundary of the cavity. The first surface defines an opening in fluid communication with the cavity and a regulator coupled to the fuel filter housing. A second surface of the fuel filter housing, which is disposed at the second end portion of the fuel filter housing, forms a second boundary of the cavity. The second surface defines an opening in fluid communication with the cavity and a fuel inlet fitting.

In some embodiments, a method includes servicing and/or replacing a fuel filter of an in-tank fuel delivery module without removing the fuel delivery module from the fuel tank.

In some embodiments, for example, a method includes removing a cover from a fuel filter housing such that a cavity defined by a body portion of the fuel filter housing is accessible from a region outside of the fuel tank. The fuel filter housing is coupled to a fuel tank such that the body portion of the fuel filter housing is disposed within the fuel tank. The cover is removed such that a flow passageway between a fuel pump and the cavity is maintained. A first fuel filter is removed from the cavity of the fuel filter housing. A second fuel filter, such as, for example, a replacement filter, is then disposed into the cavity of the fuel filter housing. The cover is coupled to the fuel filter housing such that the cavity is fluidically isolated from the region outside of the fuel tank.

Figure 1:
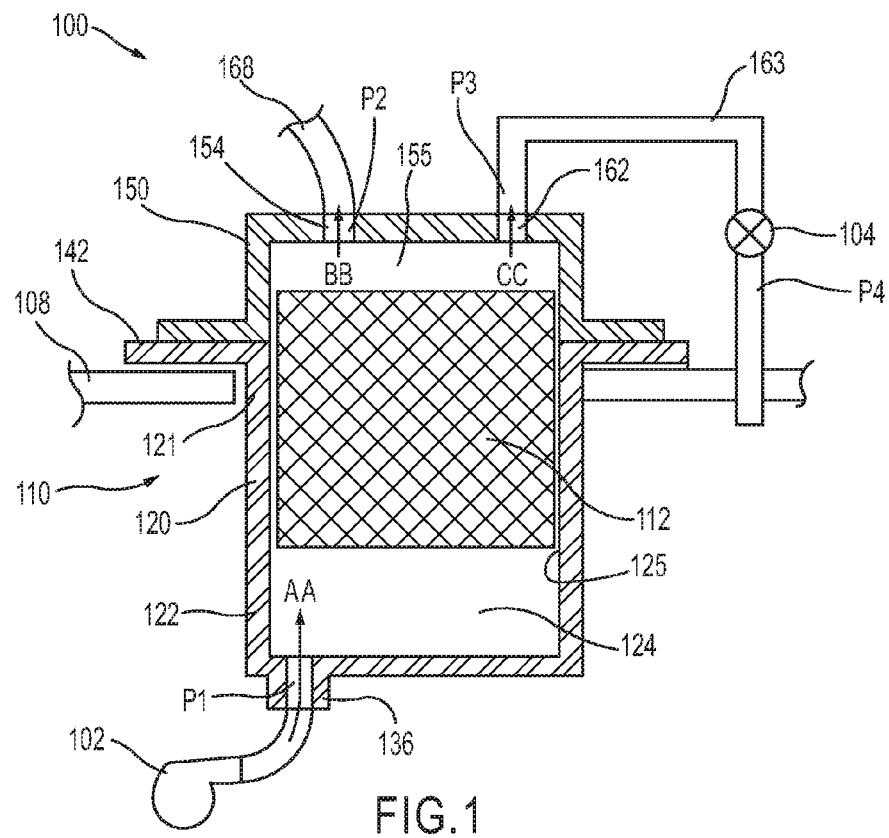
FIG. 1 is a schematic illustration of a fuel delivery module according to an embodiment.

FIG. 1 is a schematic illustration of a fuel delivery module 100 according to an embodiment. The fuel delivery module 100 includes a fuel pump 102, a regulator 104 and a filter assembly 110. The fuel delivery module 100 is coupled to a fuel tank 108 such that at least a portion of the fuel delivery module 100 is disposed within the fuel tank 108. More particularly, the fuel delivery module 100 is coupled to the fuel tank 108 such that the fuel pump 102 and at least a portion of the fuel filter assembly 110 are disposed within the fuel tank 108. The fuel pump 102 can be any suitable mechanism for producing a pressure and/or fuel flow within the fuel delivery module 100 as described herein. In some embodiments, for example, the fuel pump 102 can be an electronic gear pump, a gerotor pump, a vane pump or the like. The regulator 104 can be any suitable mechanism for regulating a fuel pressure and/or a fuel flow within the fuel delivery module 100 as described herein. In some embodiments, for example, the regulator 104 can be a commercially-available flow-through pressure regulator.

The filter assembly 110 includes a housing 120, a cover 150 and a fuel filter 112. The housing 120 includes a first end portion 121 and a second end portion 122, and defines a cavity 124. The cavity 124 is configured to receive at least a portion of the fuel filter 112. Although the fuel filter 112 is shown as having a portion disposed outside of the cavity 124, in other embodiments, the fuel filter 112 can be disposed entirely within the cavity 124. In some embodiments, the fuel filter 112 and a portion of a surface 125 defining the cavity 124 can form a substantially fluid-tight seal such that fuel cannot flow between the surface 125 and the fuel filter 112. Similarly stated, in some embodiments, the fuel filter 112 and a portion of a surface 125 can form a substantially fluid-tight seal such that substantially all of the fuel flowing through the cavity 124 flows through the fuel filter 112.

The second end portion 122 of the housing 120 is disposed within the fuel tank 108. The second end portion 122 of the housing 120 includes an inlet connector 136 configured to fluidically couple the cavity 124 to the fuel pump 102. Similarly stated, the inlet connector 136 defines at least a portion of a flow pathway P1 between the outlet of the fuel pump 102 and the cavity 124. In this manner, fuel from the fuel pump 102 can flow into the cavity 124, as shown by the arrow AA in FIG. 1. In some embodiments, the inlet connector 136 can include a check valve to prevent flow in a direction opposite the direction shown by the arrow AA.

The first end portion 121 of the housing 120 includes a flange 142 disposed outside of and coupled to the fuel tank 108. When the flange 142 is coupled to the fuel tank 108, the second end portion 122 of the housing 120 is disposed within the fuel tank 108. The flange 142 can be coupled to the fuel tank 108 in any suitable manner, such as, for example, by a bolted connection, a threaded connection, by a snap-ring, or the like. In some embodiments, the flange 142 and a portion of the fuel tank 108 can form a substantially fluid-tight seal. Similarly stated, in some embodiments, the flange 142 and a portion of the fuel tank 108 can form a seal that substantially prevents a liquid and/or gas from being conveyed from within the fuel tank 108 to a region outside of the fuel tank 108. In some embodiments, the flange 142 and a portion of the fuel tank 108 can form a substantially hermetic seal.

The cover 150 is removably coupled to the first end portion 121 of the housing 120. Similarly stated, the cover 150 is coupled to the first end portion 121 of the housing 120 in a manner configured to allow the cover to be repeatedly removed and recoupled to the first end portion 121 of the housing 120. In this manner, the cover 150 can be removed from the first end portion 121 of the housing 120 when the housing 120 is coupled to the fuel tank 108 to allow the cavity 124 to be accessed from a region outside of the fuel tank 108. Similarly stated, the cover 150 can be removed from the first end portion 121 of the housing 120 to allow the fuel filter 112 to be serviced and/or replaced. The cover 150 can be coupled to the first end portion 121 of the housing 120 in any suitable manner, such as for example, by a bolted joint connection, by a snap ring, by a threaded coupling, by an interference fit and/or the like.

The cover 150 defines a cavity 155, a first lumen 154 and a second lumen 162. The cavity 155 is configured to receive a portion of the fuel filter 112. When the cover 150 is coupled to the first end portion 121 of the housing 120, the cavity 155 is in fluid communication with the cavity 124 of the housing 120 via the fuel filter 112. In this manner, when fuel flows from the cavity 124 into the cavity 155, the fuel is filtered by the fuel filter 112. Thus, the cavity 155 of the cover 150 is downstream of the fuel filter 112 and contains filtered fuel.

The first lumen 154 is in fluid communication with the cavity 155 of the cover 150 and a fuel outlet line 168, which provides a flow path from the fuel tank 108 to the engine (not shown). Additionally, the first lumen 154 is in fluid communication with the cavity 124 (vial the fuel filter 112). Thus, the first lumen 154 defines at least a portion of a flow pathway P2 between the cavity 155 of the cover 150, which contains filtered fuel, and the fuel outlet line 168. In this manner, after the fuel passes through the fuel filter 112, at least a portion of the fuel can flow from the cavity 155 to the fuel outlet line 168, as shown by the arrow BB in FIG. 1.

The second lumen 162 is in fluid communication with the cavity 155 of the cover 150 and the regulator 104 via the regulator line 163. Additionally, the second lumen 162 is in fluid communication with the cavity 124 (vial the fuel filter 112). Thus, the second lumen 162 defines a portion of a flow pathway P3 between the cavity 155 of the cover 150, which contains filtered fuel, and the regulator 104. In this manner, after the fuel passes through the fuel filter 112, at least a portion the fuel can flow from the cavity 155 to the regulator 104, as shown by the arrow CC in FIG. 1. The regulator 104 selectively provides a flow path P4 from the cavity 155 to the fuel tank 108 to regulate the flow and/or pressure of the fuel within the cavity 155.

In use, fuel from the fuel pump 102 is conveyed through the inlet connector 136 of the housing 120 and into the cavity 124, as shown by the arrow AA. Although the fuel pump 102 may include an inlet filter (i.e., a filter on the suction side of the pump 102), the fuel in the cavity 124 is referred to as unfiltered fuel. The unfiltered fuel is then conveyed through the fuel filter 112 into the cavity 155 of the cover 150. The filtered fuel within the cavity 155 of the cover 150 is conveyed in parallel to the fuel outlet line 168 and the regulator 104 via the first lumen 154 (as shown by the arrow BB) and the second lumen 162 (as shown by the arrow CC), respectively. In this manner the fuel filter assembly 110 provides filtered fuel at a regulated pressure and/or flow rate to the fuel outlet line 168.

Although the flow path P3 is shown as fluidically coupling the cavity 155 of the cover 150 to the regulator 104, in other embodiments, the housing 120 can define a flow path that fluidically couples the cavity 124 of the housing 120 to the regulator 104. Said another way, in some embodiments, the fuel delivery module 100 can be configured to regulate the flow and/or the pressure of the unfiltered fuel.

Figure 2:
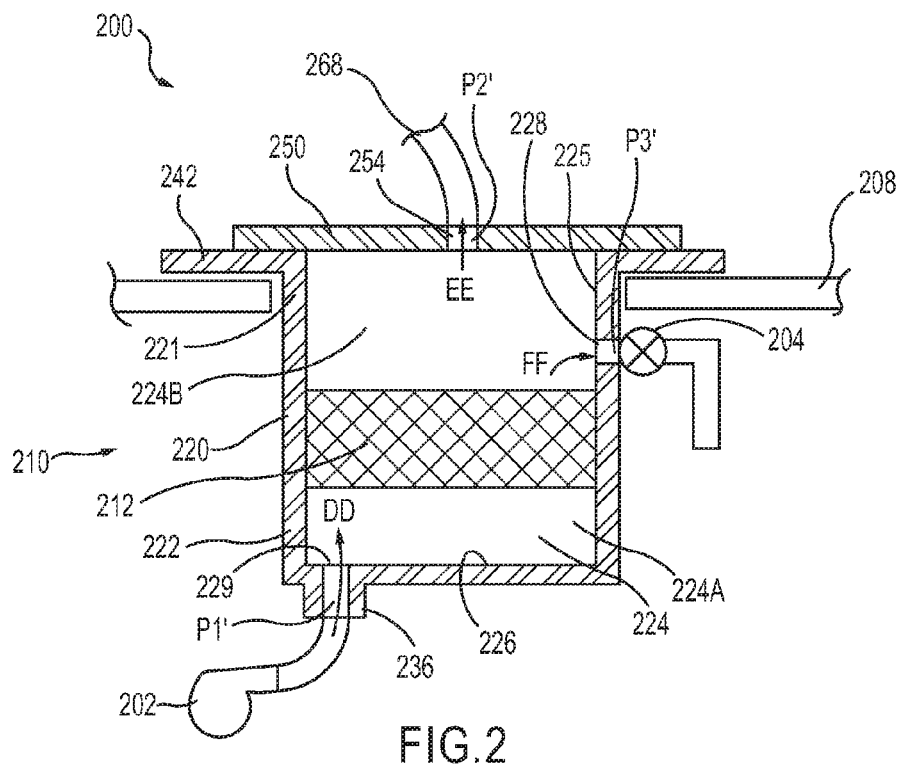
FIG. 2 is a schematic illustration of a fuel delivery module according to an embodiment.

Although the regulator 104 is shown as being disposed outside of the fuel tank 108 and spaced apart from the housing 120 (e.g., via the regulator line 163), in other embodiments, the regulator 104 can be disposed within the fuel tank 108 and/or coupled to the housing 120. For example, FIG. 2 is a schematic illustration of a fuel delivery module 200 according to an embodiment having a regulator 204 disposed within a fuel tank 208. The fuel delivery module 200 includes a fuel pump 202, the regulator 204 and a filter assembly 210. The fuel delivery module 200 is coupled to the fuel tank 208 such that the fuel pump 202 and at least a portion of the fuel filter assembly 210 are disposed within the fuel tank 208. The fuel pump 202 can be any suitable mechanism for producing a pressure and/or fuel flow within the fuel delivery module 200 as described herein. The regulator 204 can be any suitable mechanism for regulating a fuel pressure and/or a fuel flow within the fuel delivery module 200 as described herein.

The filter assembly 210 includes a housing 220, a cover 250 and a fuel filter 212. The housing 220 includes a first end portion 221 and a second end portion 222. The first end portion 221 of the housing 220 includes a flange 242 disposed outside of and coupled to the fuel tank 208. The flange 242 can be coupled to the fuel tank 208 in any suitable manner, such as, for example, by a bolted connection, by a snap-ring, or the like. In some embodiments, the flange 242 and a portion of the fuel tank 208 can form a substantially fluid-tight seal, as described above. The second end portion 222 of the housing 220 is disposed within the fuel tank 208 when the flange 242 is coupled to the fuel tank 208. The second end portion 222 of the housing 220 includes an inlet fitting 236 fluidically coupled to the fuel pump 202, as described in more detail below.

The housing 220 defines a cavity 224 configured to receive the fuel filter 212. More particularly, the housing 220 includes a first surface 225 and a second surface 226 that collectively form a first portion of a boundary and a second portion of the boundary, respectively, that define the cavity 224. When the fuel filter 212 is disposed within the cavity 224, the cavity 224 is divided into a first (or unfiltered) portion 224A and a second (or filtered) portion 224B. In some embodiments, the fuel filter 212 and a portion of the first surface 225 of the housing 220 can form a substantially fluid-tight seal such that fuel cannot flow between the first surface 225 and the fuel filter 212. Similarly stated, in some embodiments, the fuel filter 212 and a portion of the first surface 225 of the housing 220 can form a substantially fluid-tight seal such that substantially all of the fuel flowing from the unfiltered portion 224A of the cavity 224 to the filtered portion 224B of the cavity 224 flows through the fuel filter 212.

The second surface 226 of the housing 220, which can be referred to as the bottom surface of the cavity 224, is included within the second end portion 222 of the housing 220. Similarly stated, the second surface 226 of the housing 220 forms a boundary of the unfiltered portion 224A of the cavity 224. The second surface 226 of the housing 220 defines an opening 229 in fluid communication with the inlet fitting 236. In this manner, fuel from the fuel pump 202 can flow into the unfiltered portion 224A of the cavity 224 via the inlet fitting 236 and the opening 229 of the second surface 226, as shown by the arrow DD in FIG. 2. Similarly stated, the opening 229 of the second surface 226 is within a flow pathway P1' between the outlet of the fuel pump 202 and the unfiltered portion 224A of the cavity 224.

The first surface 225 of the housing 220, which can be referred to as the side surface of the cavity 224, has at least a portion included within the first end portion 221 of the housing 220. Similarly stated, the first surface 225 of the housing 220 forms a boundary of the filtered portion 224B of the cavity 224. The first surface 225 can have any suitable shape, such as, for example, a cylindrical shape. The first surface 225 of the housing 220 defines an opening 228 in fluid communication with the regulator 204. In this manner, fuel from the cavity 224 can flow into the regulator 204 via the opening 228, as shown by the arrow FF in FIG. 2. Similarly stated, the opening 228 of the first surface 225 is within a flow pathway P3' between the cavity 224 and the regulator 204.

The cover 250 is removably coupled to the first end portion 221 of the housing 220. Similarly stated, the cover 250 is coupled to the first end portion 221 of the housing 220 in a manner configured to allow the cover to be repeatedly removed and recoupled to the first end portion 221 of the housing 220. In this manner, the cover 250 can be removed from the first end portion 221 of the housing 220 when the housing 220 is coupled to the fuel tank 208 to allow the cavity 224 to be accessed from a region outside of the fuel tank 208. Similarly stated, the cover 250 can be removed from the first end portion 221 of the housing 220 to allow the fuel filter 212 to be serviced and/or replaced. The cover 250 can be coupled to the first end portion 221 of the housing 220 in any suitable manner, such as for example, by a bolted joint connection, by a snap ring, by a threaded coupling, by an interference fit and/or the like.

The cover 250 defines a lumen 254 in fluid communication with the filtered portion 224B of the cavity 224 and a fuel outlet line 268. In this manner, fuel from the filtered portion 224B of the cavity 224 can flow to the engine (not shown) via the lumen 254, as shown by the arrow EE in FIG. 2. Similarly stated, the lumen 254 of the cover 250 defines a flow pathway P2' between filtered portion 224B of the cavity 224 and the fuel outlet line 268.

In use, fuel from the fuel pump 202 is conveyed through the inlet fitting 236 of the housing 220 and the opening 229 of the second surface 226 into the unfiltered portion 224A of the cavity 224, as shown by the arrow DD. The unfiltered fuel is then conveyed through the fuel filter 212 into the filtered portion 224B of the cavity 224. The filtered fuel within the filtered portion 224B of the cavity 224 is conveyed in parallel to the fuel outlet line 268 and the regulator 204. More particularly, filtered fuel within the filtered portion 224B of the cavity 224 is conveyed via the lumen 254 of the cover 250 (as shown by the arrow EE) to the fuel outlet line 268 (as shown by the arrow EE). Filtered fuel within the filtered portion 224B of the cavity 224 is also conveyed via the opening 228 of the first surface 225 to the regulator 204 (as shown by the arrow FF). In this manner the fuel filter assembly 210 provides filtered fuel at a regulated pressure and/or flow rate to the fuel outlet line 268.

As described in more detail herein, fuel delivery module 200 facilitates removal and/or servicing of the fuel filter 212 when the fuel delivery module 200 is coupled to the fuel tank 208. More particularly, to replace and/or service the fuel filter 212, a user first removes the cover 250 from the first portion 221 of the housing 220. In this manner, the cavity 224 is accessible from an area outside of the fuel tank 208. Moreover, the arrangement of the fuel filter assembly 210 allows the cover 250 to be removed without disconnecting the flow pathway P1' from the fuel pump 202 to the cavity 224. Additionally, the arrangement of the fuel filter assembly 210 allows the cover 250 to be removed without disconnecting the flow pathway P3' from the cavity 224 to the regulator 204.

The fuel filter 212 can be serviced and/or replaced by removing the fuel filter 212 from the cavity 224. The serviced fuel filter 212 or a replacement fuel filter 212 can then be disposed within the cavity 224. In some embodiments, the serviced or replacement fuel filter 212 can be disposed within the cavity 224 in any orientation. For example, in some embodiments, the serviced or replacement fuel filter 212 can be disposed within the cavity 224 in any angular orientation relative to the housing 220. The cover 250 can then be recoupled to the first end portion 221 of the housing 220. The cover 250 can be coupled to the housing 220 in any angular orientation relative to the housing 220.

Figure 3:
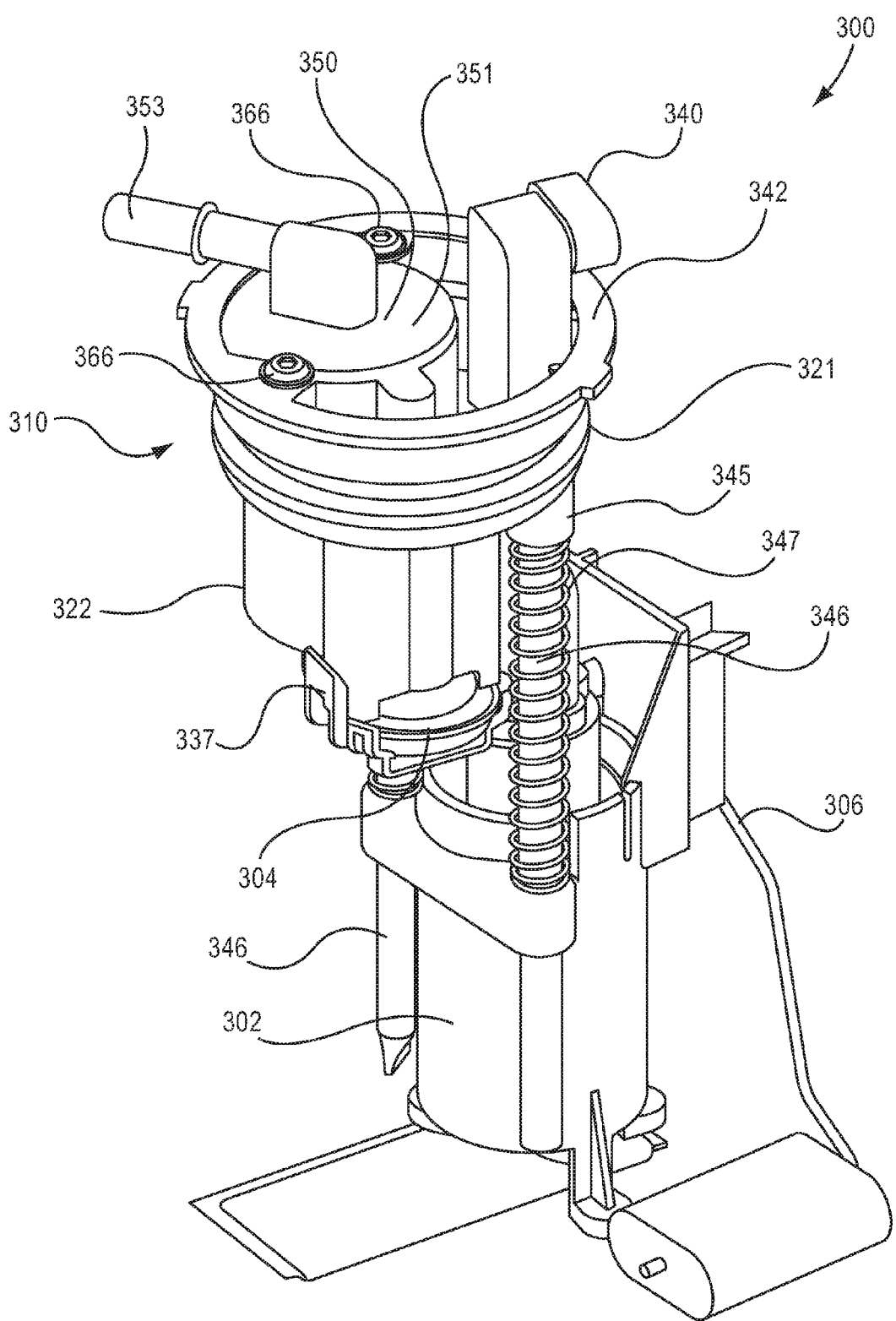
FIG. 3 is a perspective view of a fuel delivery module according to an embodiment.
Figure 4:
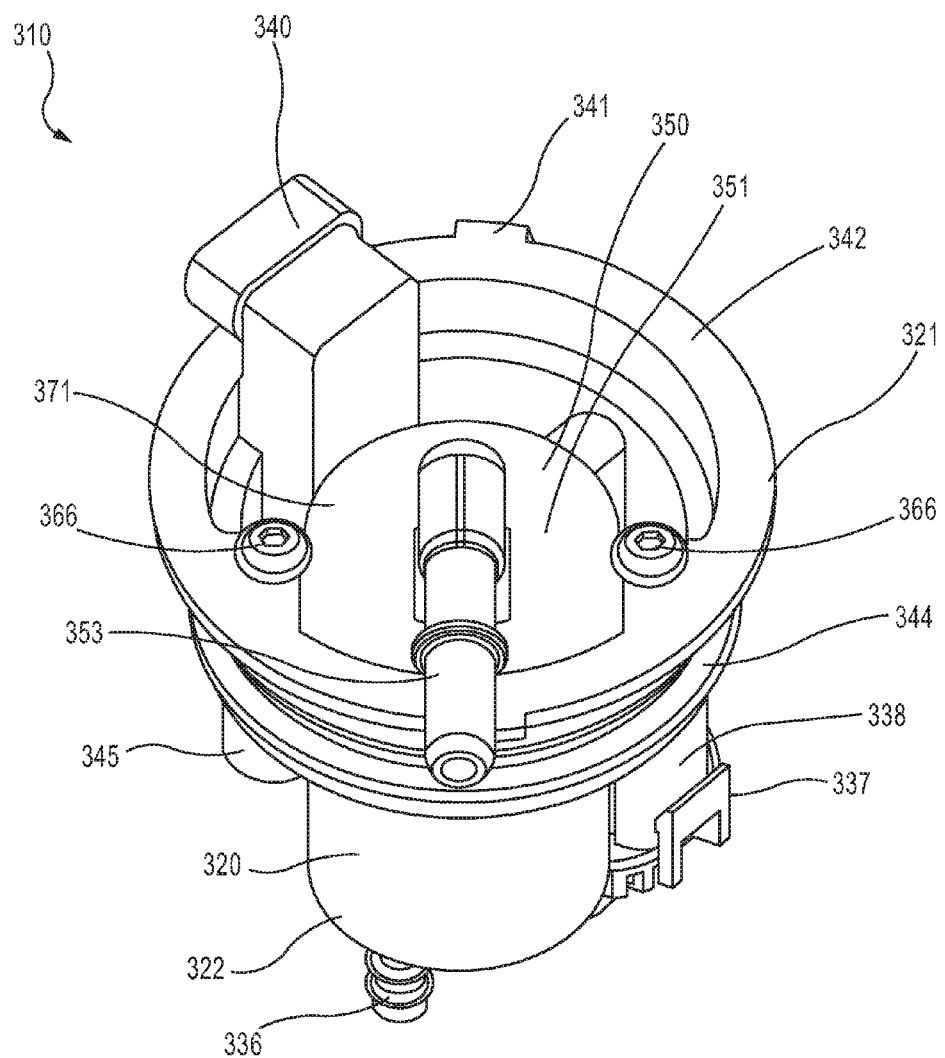
FIG. 4 is a perspective view of a fuel filter assembly of the fuel delivery module shown in FIG. 3.
Figure 5:
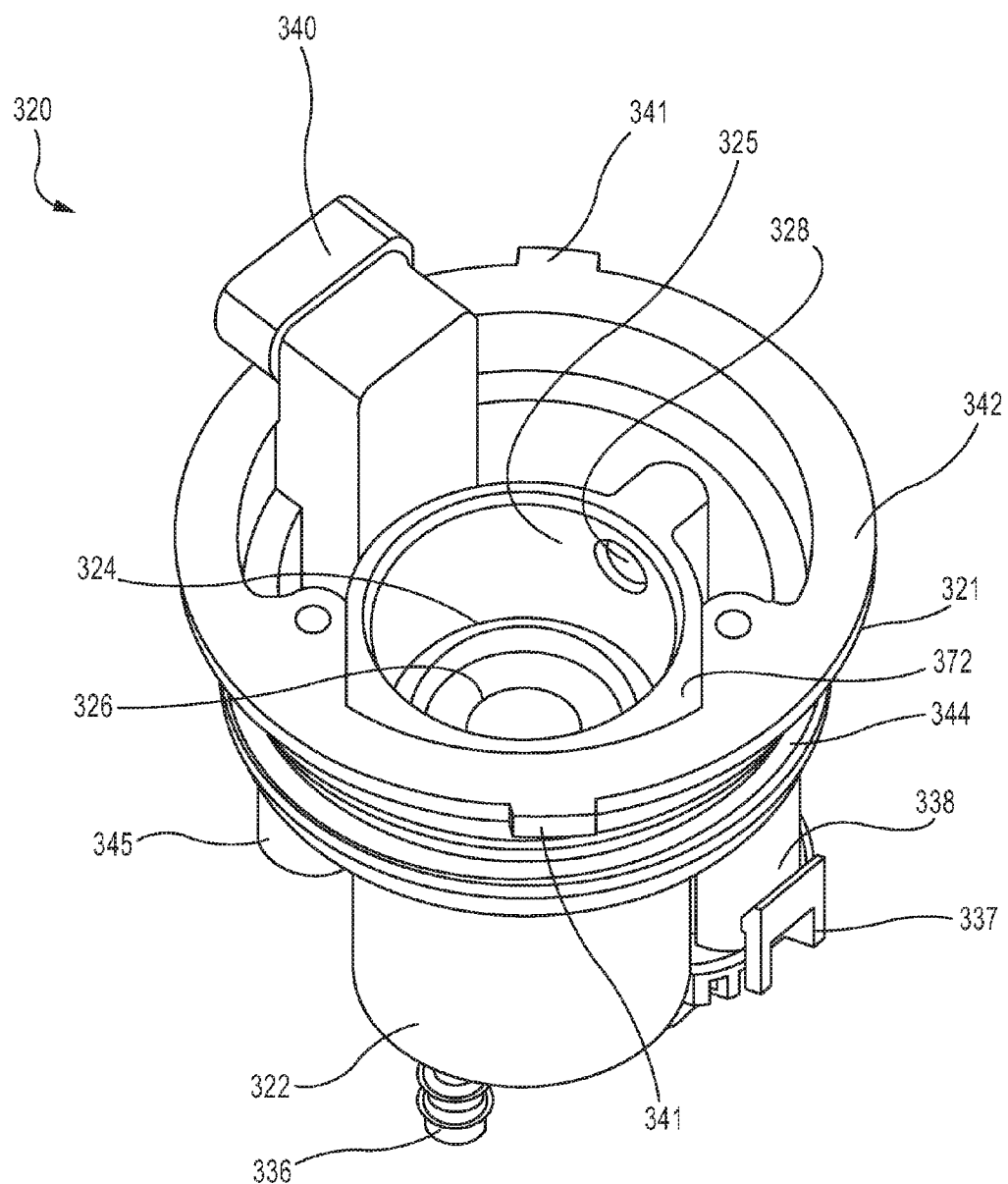
FIGS. 5 and 6 are a perspective view and a top view, respectively, of a housing of the fuel filter assembly shown in FIG. 4.
Figure 6:
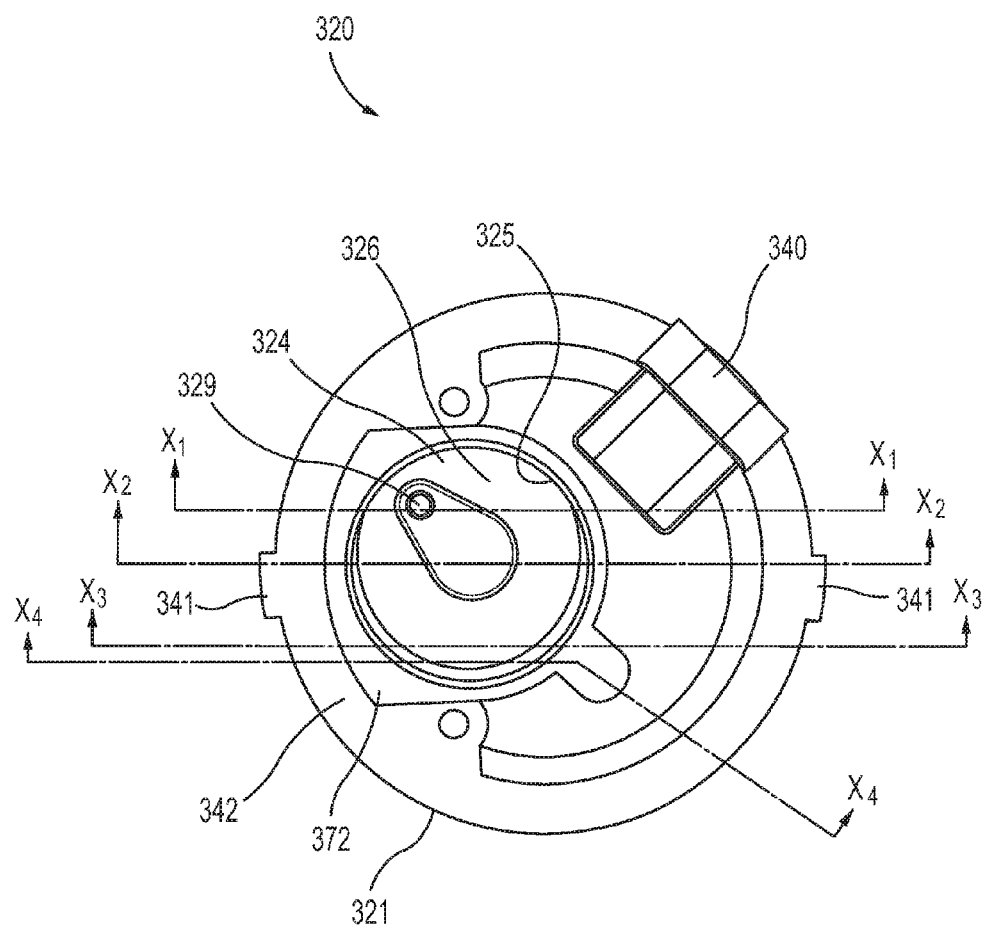
Figure 7:
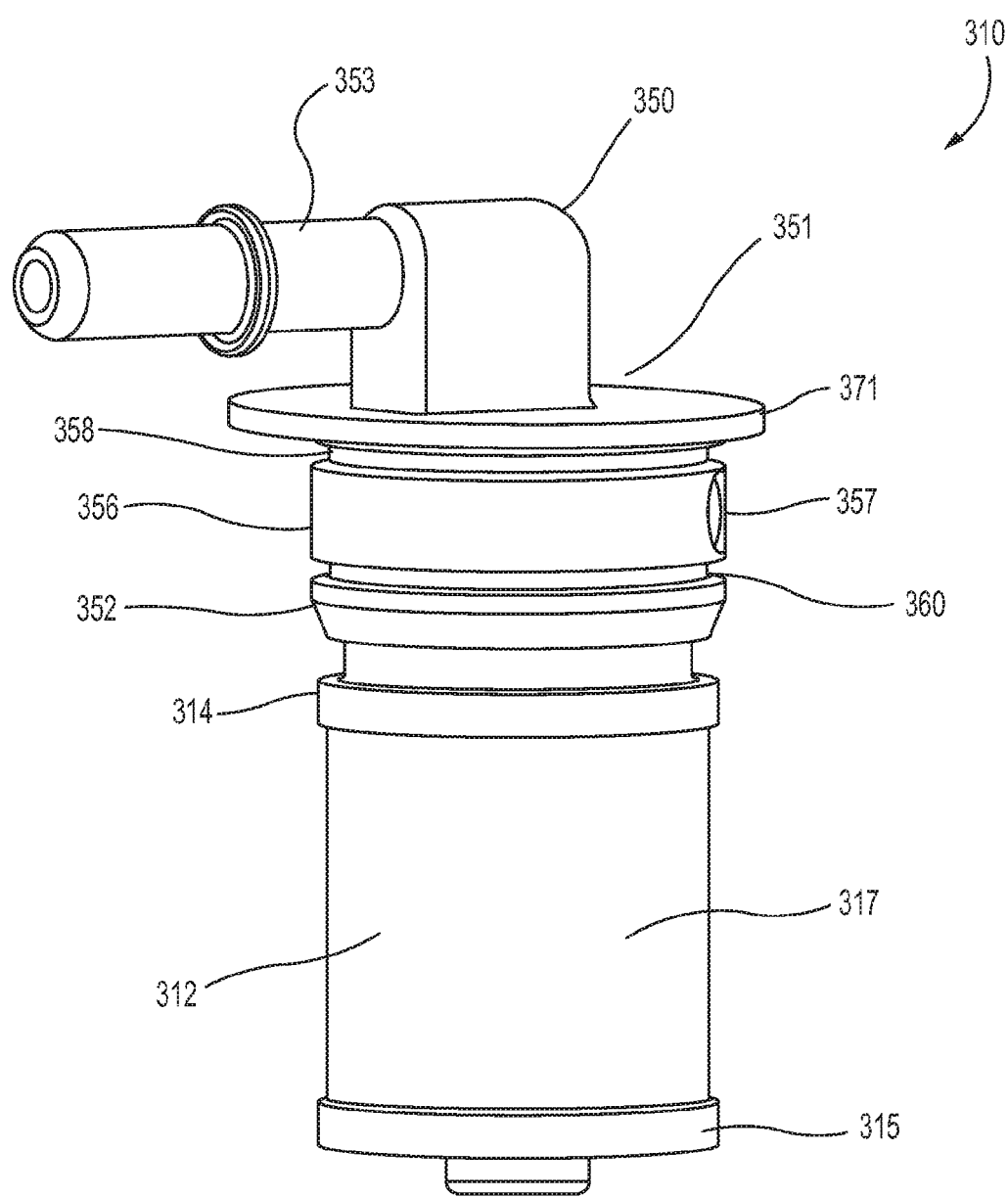
FIG. 7 is a perspective view of a portion of the fuel filter assembly shown in FIG. 4.

FIG. 3 is a perspective view of a fuel delivery module 300 according to an embodiment. The fuel delivery module 300 includes a fuel pump 302, a regulator 304, a filter assembly 310, and a fuel level sensor assembly 306. FIG. 4 is a perspective view of the fuel filter assembly 310. FIGS. 5 and 6 are a perspective view and a top view, respectively, of a housing 320 of the fuel filter assembly 310. FIG. 7 is a perspective view of a cover 350 and a fuel filter 312 of the fuel filter assembly 310. The fuel flow path within the filter assembly 310 is shown in FIGS. 8-11, which are cross-sectional views of the fuel filter assembly 310.

The fuel delivery module 300 is configured to be coupled to a fuel tank (not shown) such that the fuel pump 302, the fuel level sensor assembly 306 and at least a portion of the fuel filter assembly 310 are disposed within the fuel tank. As shown in FIGS. 3 and 4, filter assembly 310 includes two mounting protrusions 345 each configured to be coupled to a mounting rod 346. The mounting rods 346 are configured to engage the fuel pump 302 to limit lateral movement of the fuel pump 302 relative to the fuel filter assembly 310. The mounting rods 346 are configured to allow longitudinal movement of the fuel pump 302 relative to the fuel filter assembly 310. Moreover, as shown in FIG. 3, springs 347 are disposed about the mounting rods 346 to bias the fuel pump 302 longitudinally apart from the fuel filter assembly 310. In this manner, when the fuel delivery module 300 is coupled to the fuel tank, the fuel pump 302 will be biased into contact with a bottom surface of the fuel tank.

Figure 9:
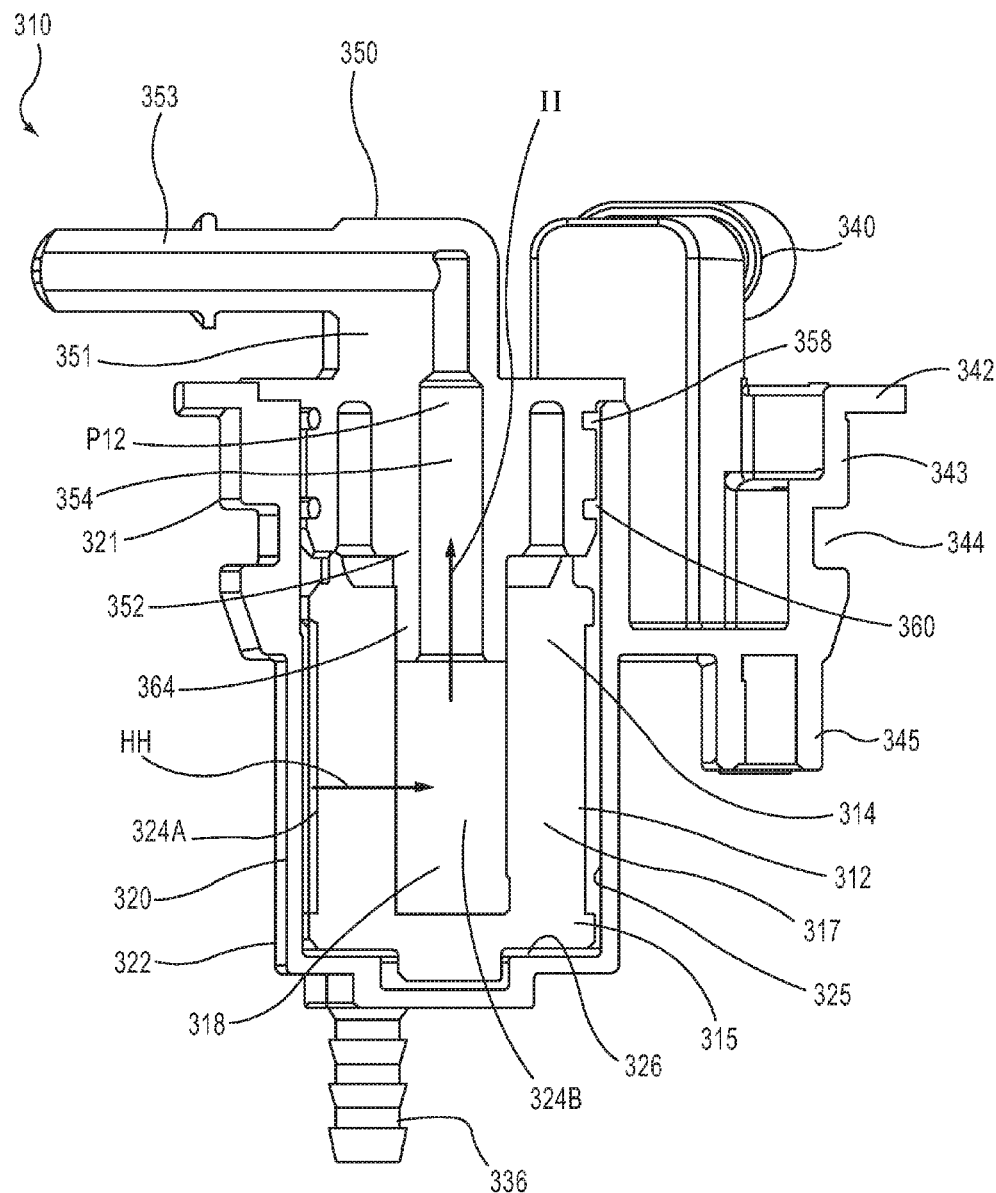
FIG. 9 is a cross-sectional view of the fuel filter assembly shown in FIG. 4 taken along line $X_2$-$X_2$ in FIG. 6.
Figure 10:
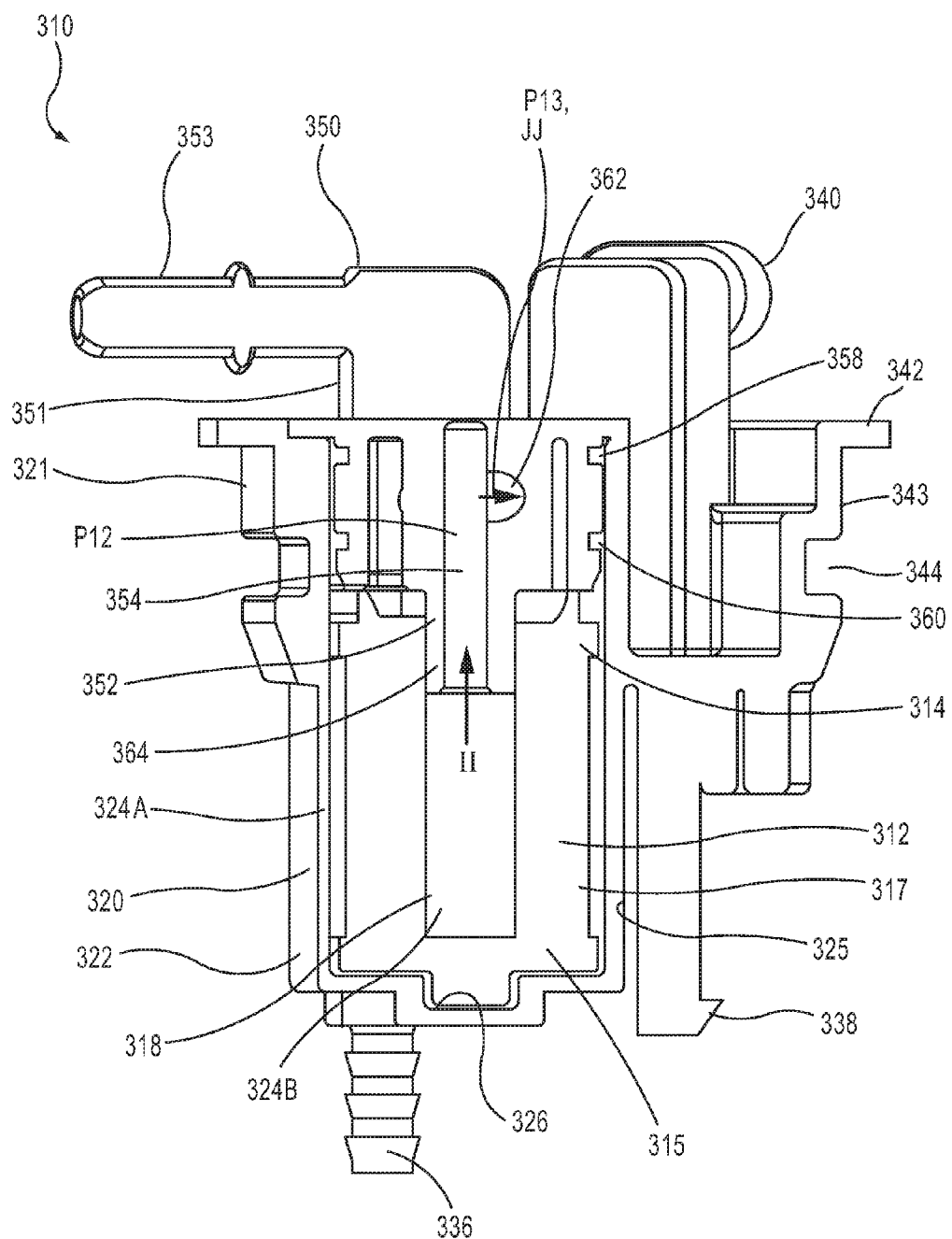
FIG. 10 is a cross-sectional view of the fuel filter assembly shown in FIG. 4 taken along line $X_3$-$X_3$ in FIG. 6.

The filter assembly 310 includes a housing 320, a cover 350 and a fuel filter 312. The fuel filter 312 includes a first end cap 314, a second end cap 315 and a filter media 317 disposed therebetween. As shown in FIGS. 9 and 10, the filter media 317 has a substantially cylindrical shape and defines a lumen 318 therein. The filter media 317 can be any suitable filter media, such as, for example, paper, fiberglass or the like. The first end cap 314 and/or the second end cap 315 can include any suitable material (e.g., an elastomer) configured to form a seal with a portion of the housing 320 and/or the cover 350, as described in more detail herein. The first end cap 314 defines an opening (not identified in FIGS. 9 and 10) such that the lumen 318 of the fuel filter 312 can be fluidically coupled to a region outside of the fuel filter 312 (e.g., the fuel outlet fitting 353) via a flow path that excludes the filter media 317. In some embodiments, the fuel filter 312 can be a commercially-available fuel filter, such as, for example, the Wix fuel filter part number 33943 produced by Affinia Group, Inc.

The housing 320 includes a first end portion 321 and a second end portion 322, and defines a cavity 324 configured to receive the fuel filter 312. More particularly, the housing 320 includes a substantially cylindrical surface 325 and a bottom surface 326 that collectively form a first boundary and a second boundary, respectively, of the cavity 324. As shown in FIG. 5, the first surface 325 of the housing 320 defines an opening 328, which, as described in more detail herein, is in fluid communication with the regulator 304. As shown in FIG. 6, the second surface 326 of the housing 320 defines an opening 329, which, as described in more detail herein, is in fluid communication with the inlet fitting 336.

As shown in FIGS. 9 and 10, when the fuel filter 312 is disposed within the cavity 324, the cavity 324 is divided into a first (or unfiltered) portion 324A and a second (or filtered) portion 324B. Similarly stated, when the fuel filter 312 is disposed within the cavity 324, the cylindrical surface 325 and the outer surface of the filter media 317 define the unfiltered portion 324A of the cavity 324, and the lumen 318 of the fuel filter 312 define the filtered portion 324B of the cavity 324. The unfiltered portion 324A of the cavity is further described as the annular portion of the cavity 324 between the fuel filter 312 and the cylindrical surface 325. The filtered portion 324B of the cavity 324 is further described as the central lumen 318 of the fuel filter 312.

When the fuel filter 312 is disposed within the cavity 324, a portion of the first end cap 314 engages the second end portion 352 of the cover 350 to form a substantially fluid-tight seal. The second end cap 315 of the fuel filter 312 fluidically isolates the lumen 318 of the fuel filter 312 from the unfiltered portion 324A of the cavity 324. Similarly stated, the second end cap 315 of the fuel filter 312 is devoid of an opening. In this manner, as described in more detail below, substantially all of the fuel flowing from the unfiltered portion 324A of the cavity 324 to the filtered portion 324B of the cavity 324 flows through the filter media 317.

Figure 8:
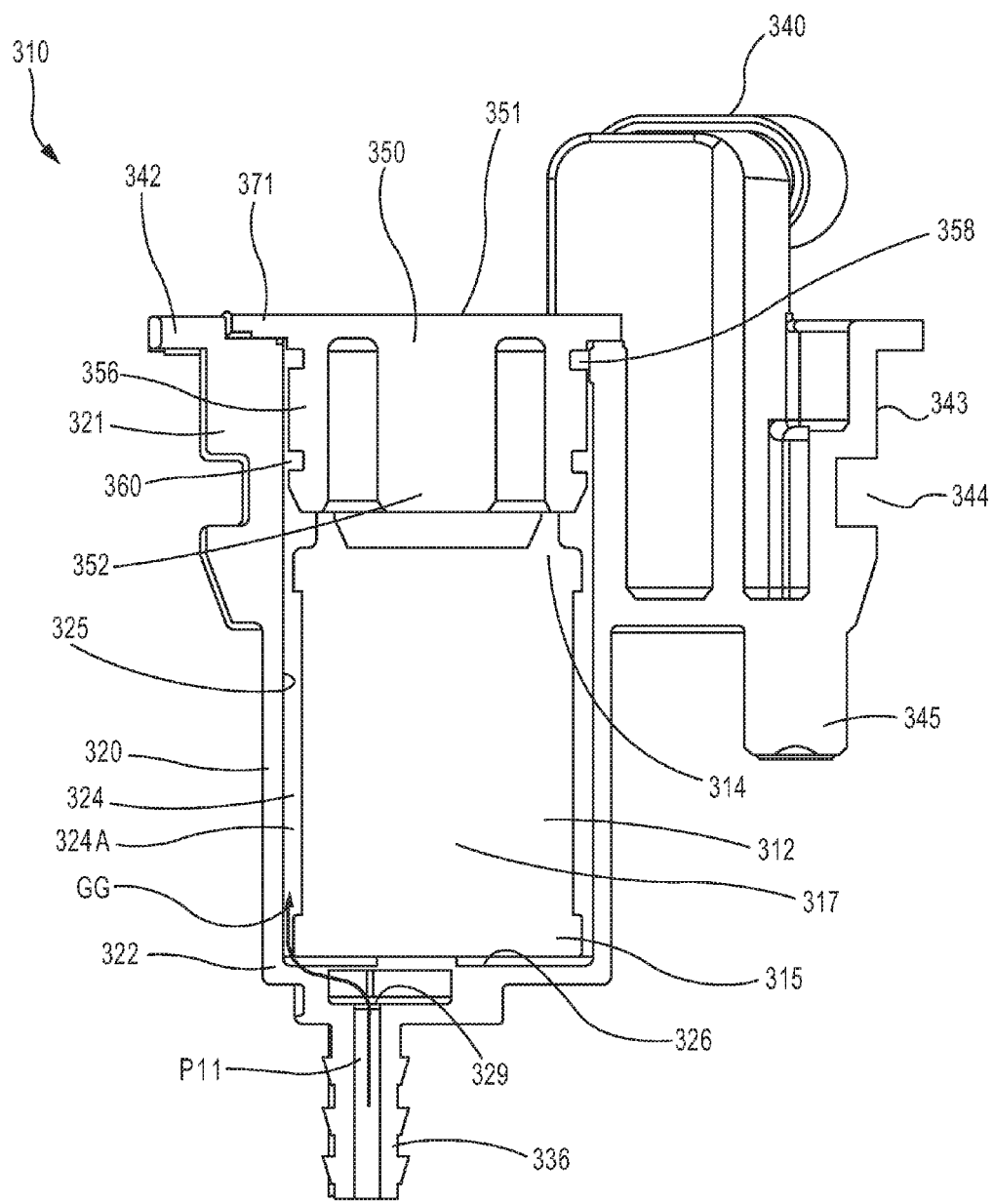
FIG. 8 is a cross-sectional view of the fuel filter assembly shown in FIG. 4 taken along line $X_1$-$X_1$ in FIG. 6.

When the fuel delivery module 300 is coupled to the fuel tank (not shown) the second end portion 322 of the housing 320 is disposed within the fuel tank. The second end portion 322 of the housing 320 includes an inlet fitting 336 configured to fluidically couple the cavity 324 to the fuel pump 302 via the opening 329 of the second surface 326. Similarly stated, as shown in FIG. 8, the inlet fitting 336 and the opening 329 define at least a portion of a flow pathway P11 between the outlet of the fuel pump 302 and the cavity 324. In this manner, fuel from the fuel pump 302 can flow into the unfiltered portion 324A of the cavity 324, as shown by the arrow GG in FIG. 8.

Figure 11:
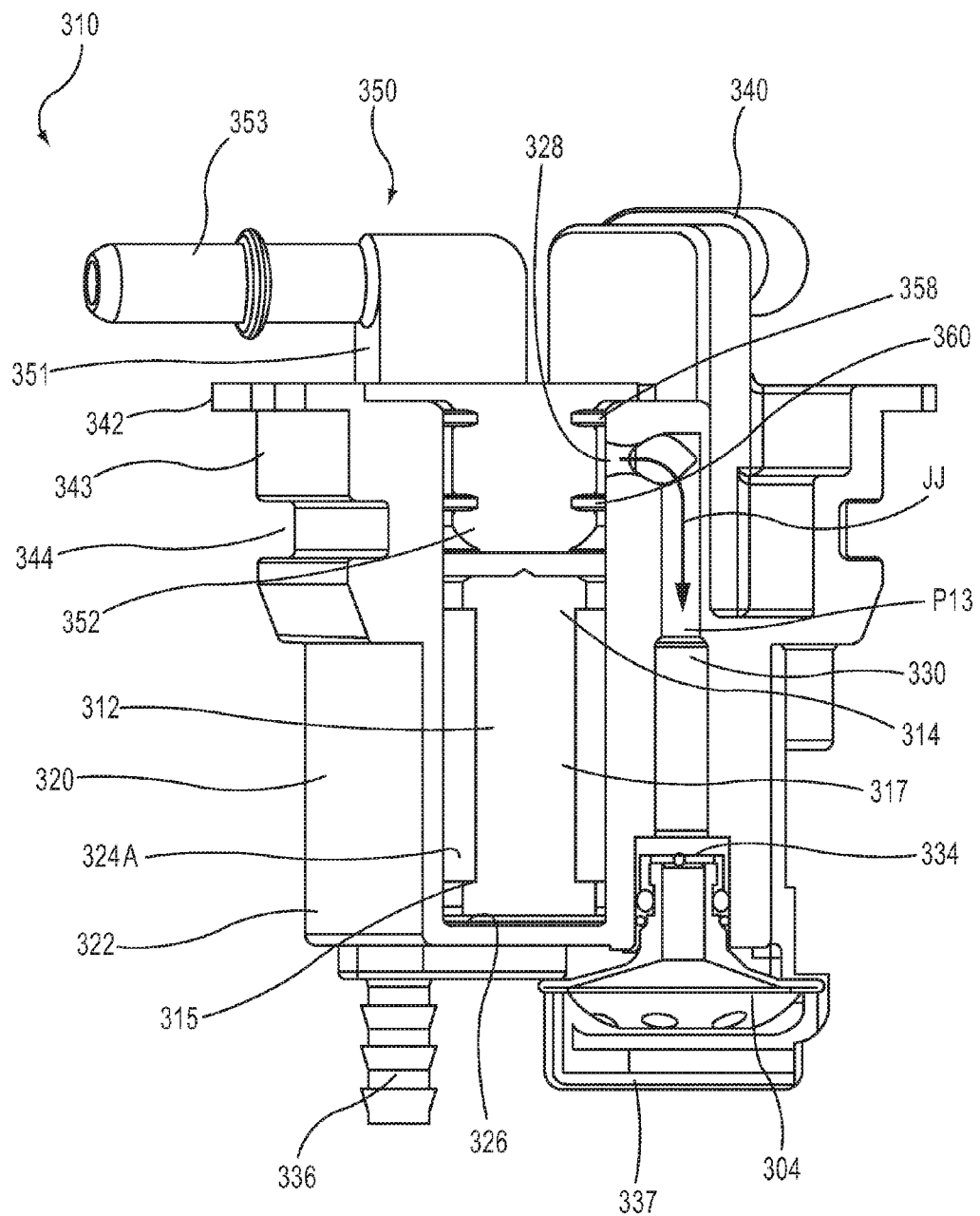
FIG. 11 is a cross-sectional view of the fuel filter assembly shown in FIG. 4 taken along line $X_4$-$X_4$ in FIG. 6.

As shown in FIG. 11, the second end portion 322 of the housing 320 defines a regulator cavity 334 configured to receive a portion of the regulator 304. As shown in FIGS. 5 and 11, the regulator cavity 334 is fluidically coupled to the cavity 324 via the opening 328 of the cylindrical surface 325 and a lumen 330 defined by the housing 320. Similarly stated, the opening 328 and the lumen 330 define at least a portion of a flow pathway P13 between the cavity 324 and the regulator cavity 334. In this manner, fuel can be conveyed from the cavity 324 to the regulator 304 as shown by the arrow JJ in FIGS. 10 and 11. The lumen 330 extends from the first end portion 321 of the housing 320 to the second end portion 322 of the housing 320. Similarly stated, the lumen 330 extends substantially the entire length of the housing 320. In other embodiments, however, the lumen 330 can have any suitable length. For example, in some embodiments, a length of the lumen 330 can be at least half a length of the housing 320.

As shown in FIGS. 5 and 10, the regulator 304 is coupled to the housing 320 by the regulator clip 337, which matingly engages a protrusion 338 of the second end portion 322 of the housing 320. In this manner, the regulator 304 can be removed and/or replaced for service. When the regulator 304 is coupled to the housing 320, an inlet portion of the regulator 304 is disposed within and in fluid communication with the regulator cavity 334. The regulator 304 can be any suitable regulator for regulating a fuel pressure and/or a fuel flow within the cavity 324 and/or the flow pathway P13. For example, in some embodiments, the regulator 304 can be a flow-through regulator configured to selectively provide a flow path from the regulator cavity 334 to the fuel tank (i.e., a return flow path) to regulate the flow and/or pressure of the fuel within the cavity 324. In some embodiments, the regulator 304 can be a commercially-available fuel regulator, such as, for example, any one of the "Micra Flow Through" regulators produced by the Continental Automotive Group.

The first end portion 321 of the housing 320 includes a flange 342 disposed outside of and coupled to the fuel tank (not shown) when the fuel delivery module 300 is coupled to the fuel tank. The flange 342 can be coupled to the fuel tank in any suitable manner, such as, for example, by a snap-ring. The flange 342 includes two protrusions or mounting keys 341 configured to maintain the orientation of the housing 320 when the housing 320 is mounted to the fuel tank. The first end portion 321 of the housing 320 defines a groove 344 that substantially circumscribes the housing 320. The groove 344 is configured to receive a seal member (e.g., an o-ring, a gasket or the like) to form a substantially fluid-tight seal between the housing 320 and the fuel tank. Similarly stated, the first end portion 321 of the housing 320, the fuel tank (not shown) and the seal member (not shown) form a seal that substantially prevents a liquid and/or gas from being conveyed from within the fuel tank to a region outside of the fuel tank 308.

The first end portion 321 of the housing 320 includes an electrical connector 340 configured to electrically couple a device outside of the fuel tank to a device disposed within the fuel tank. For example, in some embodiments, the electrical connector 340 is configured to electrically couple a power supply to the fuel pump 302 via the housing 320. The electrical connector 340 can include any suitable structure for coupling a power supply to the fuel pump 302. For example, in some embodiments, the electrical connector 340 can include a female opening configured to receive and/or retain a corresponding male connector. In other embodiments, the electrical connector 340 can include one or more protrusions and/or recesses configured to releasably couple a power supply connector to the electrical connector 340.

The cover 350 includes a first end portion 351 and a second end portion 352. The first end portion 351 includes a flange 371 and an outlet fitting 353. The flange 371 is configured to be received within a corresponding mounting recess 372 defined by the first end portion 321 of the housing 320. As shown in FIG. 4, when the flange 371 is disposed within the mounting recess 372, the cover 350 can be coupled to the first end portion 321 of the housing 320 by two mounting cap screws 366. In this manner, the cover 350 can be removably coupled to the first end portion 321 of the housing 320. Similarly stated, the cover 350 is coupled to the first end portion 321 of the housing 320 in a manner such that the cover 350 can be repeatedly removed and recoupled to the first end portion 321 of the housing 320. In this manner, as described in more detail below, the cover 350 can be removed from the first end portion 321 of the housing 320 when the housing 320 is coupled to the fuel tank 308 to allow the cavity 324 to be accessed from a region outside of the fuel tank 308. Similarly stated, the cover 350 can be removed from the first end portion 321 of the housing 320 to allow the fuel filter 312 to be serviced and/or replaced.

The second end portion 352 of the cover 350 includes a side surface 356 (see e.g., FIGS. 7-10) and a protrusion 364 (see e.g., FIG. 9). The side surface 356 includes a first groove 358 and a second groove 360. The first groove 358 and the second groove 360 each substantially circumscribe the side surface 356, and are each configured to receive a sealing member (not shown). The sealing member can be any suitable sealing member, such as, for example, an o-ring, a gasket or the like. When the cover 350 is coupled to the housing 320, the second end portion 352 is disposed within the cavity 324 of the housing 320 such that the side surface 356 is adjacent the cylindrical surface 325. In this manner the sealing members (not shown) can contact the cylindrical surface 325 of the housing 320 to form a substantially fluid-tight seal between the cover 350 and the housing 320.

As shown in FIG. 9, a portion of the protrusion 364 is disposed through the opening of the first end cap 314 of the fuel filter 312 and into the central lumen 318 of the fuel filter 312. The protrusion 364 and the opening of the first end cap 314 collectively form an interference fit. In this manner, the cover 350 and the fuel filter 312 can be decoupled from and removed from the housing 320 substantially simultaneously. Moreover, in some embodiments, the end cap 314 can be constructed from an elastomer such that the end cap 314 and the protrusion 364 form a substantially fluid-tight seal. In this manner, as described below, fuel can flow between the central lumen 318 of the fuel filter and the first lumen 354 of the cover 350 without leaking between the protrusion 364 of the cover 350 and the end cap 314 of the fuel filter 312.

The coupling between the first end cap 314 and the protrusion 364 allows the fuel filter 312 to be disposed within the cavity 324 without requiring additional structure (e.g., sealing rings, an additional fuel filter housing or the like) to fluidically isolate the central lumen 318 of the fuel filter 324 from the annular region 324A defined by the outer surface of the fuel filter 312 and the cylindrical surface 325. Moreover, the fuel filter 312 can be coupled to protrusion 364 of the cover 350 in any rotational orientation. Thus, this arrangement eliminates the need to dispose the fuel filter 312 within the cavity 324 in a predetermined orientation, such as, for example to align a sealing mechanism, a fuel delivery port or the like.

As shown in FIGS. 8 and 9, when the fuel filter 312 and the cover 350 are collectively coupled to the housing 320, a portion of the first end cap 314 is in contact with a distal surface the second end portion 352 of the cover 350. In some embodiments, the first end cap 314 and the distal surface of the second end portion 352 of the cover can form a substantially fluid-tight seal. In this manner, fuel within the unfiltered portion 324A of the cavity 324 can be prevented from flowing into the filtered portion 324B of the cavity 324 (i.e., the central lumen 318 of the fuel filter 312) via a the interface between the end cap 314 and the cover 350. Similarly stated, this arrangement ensures that fuel will flow from the unfiltered portion 324A of the cavity 324 to the filtered portion 324B of the cavity 324 via filter media 317, as shown by the arrow HH in FIG. 9.

The cover 350 defines a first lumen 354 (see FIG. 9) and a second lumen 362 (see FIG. 10). When the cover 350 is coupled to the housing 320, the first lumen 354 is in fluid communication with the outlet fitting 353 and the lumen 318 of the fuel filter 312. Similarly stated, the first lumen 354 is in fluid communication with the outlet fitting 353 and the filtered portion 324B of the cavity 324. Thus, the first lumen 354 defines at least a portion of a flow pathway P12 between the portion of the cavity 324 of the housing 320 that contains filtered fuel and the outlet fitting 353. In this manner, after the fuel passes through the fuel filter media 317, at least a portion of the fuel can flow from the filtered portion 324B of the cavity 324 to the fuel outlet fitting 353, as shown by the arrow II in FIGS. 9 and 10.

Additionally, the first lumen 354 is in fluid communication with the second lumen 362. Similarly stated, as shown in FIG. 10, the cover 350 is configured such that the first lumen 354 intersects the second lumen 362. Although the second lumen 362 is shown as intersecting the first lumen 354 at an angle of approximately 90 degrees, in other embodiments, the first lumen 354 and the second lumen 362 can intersect at any suitable angle. The second lumen 362 is in fluid communication with an opening 357 (see e.g., FIG. 7) defined by the side surface 356 of the cover 350. Moreover, when the cover 350 is coupled to the housing 320, the opening 357 is substantially aligned with the opening 328 defined by the surface 325 of the housing 320. As described above, the opening 328 and the lumen 330 of the housing collectively define at least a portion of the flow pathway P13 to the regulator cavity 334. Thus, the second lumen 362 and the opening 357 also define at least a portion of the flow pathway P13 between the first lumen 354 of the cover 350 and the regulator cavity 334. In this manner, a portion of the filtered fuel can be conveyed from the first lumen 354 to the regulator 304 as shown by the arrow JJ in FIGS. 10 and 11. Similarly stated, the cover 350 provides a first flow path (e.g., flow path P12) through which filtered fuel can be conveyed from the cavity 324 to the outlet fitting 353 and a second flow path (e.g., flow path P13) parallel to the first flow path, through which filtered fuel can be conveyed from the cavity 324 to the regulator 304.

The cover 350 can be constructed from any suitable material, such as, for example, a molded plastic, a machined metal, or a stamped metal assembly. The first lumen 354 and/or the second lumen 362 can be formed by any suitable process, such as, for example, molding, drilling, casting, or the like.

In use, fuel from the fuel pump 302 is conveyed through the inlet fitting 336 of the housing 320 and into the cavity 324, as shown by the arrow GG in FIG. 8. More particularly, the fuel is conveyed from the fuel pump 302 to the annular region 324A between the outer surface of the fuel filter 312 and the cylindrical surface 325 of the housing 320. Although the fuel pump 302 may include an inlet filter (i.e., a filter on the suction side of the pump 302), the fuel in the annular portion 324A of the cavity 324 is referred to as unfiltered fuel. The unfiltered fuel is then conveyed through the filter media 317 into the central lumen 318 of the fuel filter 312, as shown by the arrow HH in FIG. 9. Similarly stated, unfiltered fuel is then conveyed through the filter media 317 into the filtered portion 324B of the cavity 324.

The filtered fuel within the cavity 324B of the housing 320 is conveyed in parallel to the fuel outlet fitting 353 and the regulator 304 via the first lumen 354 (as shown by the arrow II) and the second lumen 362 (as shown by the arrow JJ), respectively, as described above. In this manner the fuel filter assembly 310 provides filtered fuel at a regulated pressure and/or flow rate to the fuel outlet fitting 353.

Figure 12:
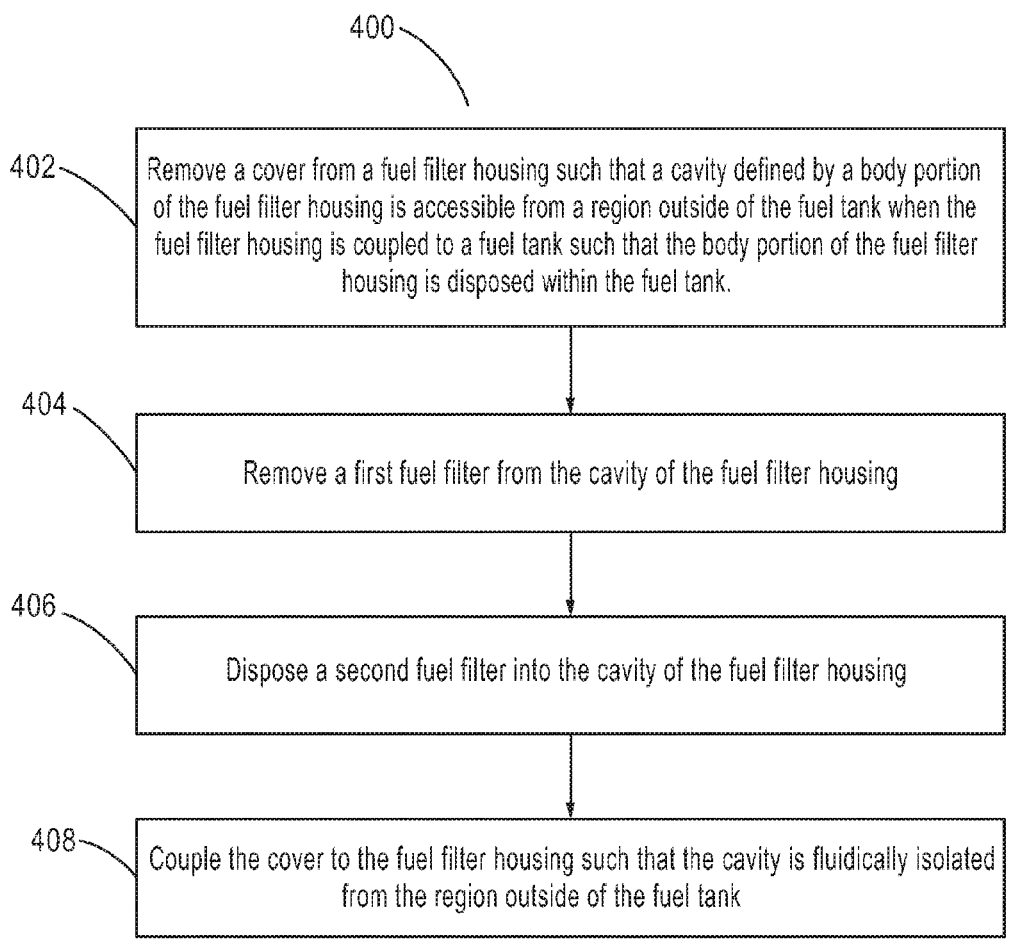
FIG. 12 is a flow chart of a method of servicing a fuel filter assembly according to an embodiment.

FIG. 12 is a flow chart of a method 400 of servicing a fuel filter assembly according to an embodiment. The illustrated method includes removing a cover from a fuel filter housing such that a cavity defined by a body portion of the fuel filter housing is accessible from a region outside of the fuel tank, at 402. The fuel filter housing, which can be any of the housings shown and described herein (e.g., fuel filter housing 320), is coupled to a fuel tank such that the body portion of the fuel filter housing is disposed within the fuel tank. The cover, which can be any of the covers shown and described herein (e.g., cover 350), is removed such that a flow passageway between a fuel pump and the cavity is maintained. Said another way, the cover is removed without disrupting a portion of the flow passageway between the fuel pump and the cavity. Said yet another way, the cover is removed without removing a seal member configured to fluidically isolate the flow passageway between the fuel pump and the cavity. In this manner, as described below, the fuel filter assembly can be serviced without compromising the flow passageway between the fuel pump and the fuel filter assembly.

A first fuel filter is removed from the cavity of the fuel filter housing, at 404. The first fuel filter can be any suitable fuel filter of the types shown and described herein. In some embodiments, the first fuel filter can be similar to the fuel filter 312 shown and described above. In some embodiments, the first fuel filter can be coupled to the cover such that the first fuel filter is removed from the cavity when the cover is removed from the fuel filter housing. Similarly stated, in some embodiments, the cover and the first fuel filter can be removed from the fuel filter housing substantially simultaneously.

A second fuel filter is disposed within the cavity of the fuel filter housing, at 406. In some embodiments, the second fuel filter can be substantially similar to the first fuel filter, and can be, for example, a replacement fuel filter. In some embodiments, the second filter can be the same as the first filter (e.g., the second filter can be the first filter after servicing or cleaning). In other embodiments, the second fuel filter can be different from (e.g., can have a different size, a different shape and/or be constructed from different materials) than the first fuel filter. In some embodiments, the fuel filter can be disposed within the cavity in any orientation. Similarly stated, in some embodiments, the fuel filter need not be placed within the cavity in any particular angular orientation.

The cover is then coupled to the fuel filter housing such that the cavity is fluidically isolated from the region outside of the fuel tank, at 408. The cover can include one or more seals, of the type described above with reference to the seal grooves 358 and 360 of the cover 350, to fluidically isolate the cavity from the region outside of the fuel tank. The cover can be coupled to the fuel filter housing in any suitable manner, such as, for example, by screws, clips, snap rings, a threaded flange or the like. In some embodiments, the a fluid-tight seal is formed between a surface of the cover and a surface of the fuel filter when the cover is coupled to the fuel filter housing. For example, in some embodiments, a bottom surface of the cover can engage, contact and/or compress an end cap (e.g., end cap 314) of the fuel filter to form a substantially fluid-tight seal when the cover is coupled to the fuel filter housing.

In some embodiments, the cover can include a lumen configured to convey a portion of the fuel to a regulator coupled to and/or disposed within the fuel filter assembly. Said another way, in some embodiments, the cover can include a fuel bypass lumen. For example, in some embodiments, the cover can be similar to the cover 350 shown and described above, and can include a lumen similar to the lumen 362. In such embodiments, the coupling can include substantially aligning the lumen (and/or an opening associated with the lumen) with an opening defined by the fuel filter housing such that the lumen of the cover is in fluid communication with the regulator. In such embodiments, the cover can be aligned in any suitable manner. For example, in some embodiments, the cover can include one or more protrusions and/or recesses configured to mate with corresponding protrusions and/or recesses of the fuel filter housing to ensure that the cover is aligned with the fuel filter housing. In other embodiments, the cover can include a flange (e.g., similar to the flange 371) having one or more flatted surfaces configured to be matingly received within a recess defined by the fuel filter housing (e.g., similar to the recess 372) to align the cover and the fuel filter housing.

In some embodiments, the second fuel filter can be coupled to the cover such that the second fuel filter is disposed within the cavity when the cover is coupled to the fuel filter housing. Similarly stated, in some embodiments, the cover and the second fuel filter can be coupled to the fuel filter housing substantially simultaneously.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially. While the embodiments have been particularly shown and described, it will be understood that various changes in form and details may be made.

For example, although the fuel filter assemblies have been shown and described above as including a regulator configured to receive and/or regulate filtered fuel, in other embodiments, a fuel filter assembly can include a regulator configured to receive and/or regulate unfiltered fuel. Similarly stated, although the fuel filter assemblies have been shown and described above as including a regulator disposed downstream of the fuel filter, in other embodiments, a fuel filter assembly can include a regulator disposed upstream of the fuel filter.

Although the fuel regulator 302 is shown and described above as being in fluid communication with the regulator cavity 334 of the housing 320, in some embodiments the fuel regulator can be disposed in any suitable location within the fuel system. For example, in some embodiments, the fuel regulator can be coupled directly to the fuel pump. In other embodiments, the fuel regulator can be in fluid communication with the lumen 330 of the housing 320 via a fuel line. In other embodiments, a fuel filter assembly can include multiple fuel regulators.

Although the fuel filter assemblies have been shown and described above as including a regulator configured to selectively bypass fuel to the fuel tank, in other embodiments a fuel filter assembly can include a damper or other fuel regulator that does not selectively bypass fuel to the fuel tank. In some embodiments, a fuel filter assembly can include more than one fuel regulation component (e.g., a damper and a fuel regulator).

Although the regulator 304 is shown and described as being coupled to the housing 320 by the regulator clip 337, in other embodiments, the regulator 304 can be coupled to the housing 320 by any suitable mechanism. For example, in some embodiments, the regulator 304 can be removably coupled to the housing 320 by a bolted joint, a snap ring, an interference fit or the like. In other embodiments, the regulator 304 can be coupled to the housing via a coupler that is substantially permanently coupled to the housing 320. For example, in some embodiments, a coupler can be coupled to the housing 320 via an adhesive coupling, a spin weld, a melt bond or the like.

Although the fuel filter cover 350 is shown and described above as being coupled to the housing 350 by screws 366, in other embodiments, the fuel filter cover 350 can be removably coupled to the housing by any suitable mechanism. For example, in some embodiments, a cover can be can be removably coupled to the housing by a snap ring configured to be disposed within a groove defined by the housing (not shown in the figures above) and engage a portion of the cover. In this manner, the cover can be coupled to the housing in any desired orientation. Said another way, in this manner, the cover can be coupled to the housing in any rotational position, thereby allowing the angular position of the fuel outlet fitting to be easily changed for different applications.

In some embodiments, the first end portion 321 and the second end portion 321 are integral components of the housing 320. Similarly stated, the first end portion 321 and the second end portion 322 of the housing 320 are monolithically constructed and can be, for example, constructed from molded plastic, machined metal, or a stamped metal assembly. Alternatively, in other embodiments, the first end portion 321 and the second end portion 322 are constructed separately and coupled together via any suitable coupling means, such as, for example, welding.

Although various embodiments have been described as having particular features and/or combinations of components, other embodiments are possible having a combination of any features and/or components from any of embodiments as discussed above. For example, in some embodiments, a fuel filter assembly can include a cover having intersecting flow passageways similar to the flow passageways 354 and 362 of cover 350, and a cavity configured to contain a portion of a fuel filter, similar to the cavity 155 of cover 150.

What is claimed is:

1. An apparatus, comprising:
a fuel filter housing defining a cavity configured to receive at least a portion of a fuel filter, a side wall of the fuel filter housing defining a regulator passageway in fluid communication with the fuel filter cavity, the regulator passageway downstream of the fuel filter cavity, at least a portion of a centerline defined by the regulator passageway is offset from a centerline defined by the fuel filter cavity, a first portion of the fuel filter housing including a flange configured to be coupled to a fuel tank such that a surface of the flange is outside of the fuel tank, a second portion of the fuel filter housing configured to be disposed within the fuel tank, the second portion of the fuel filter housing including an inlet connector configured to fluidically couple the fuel filter cavity to a fuel pump; and
a cover configured to be removably coupled to the first portion of the fuel filter housing, the cover defining an outlet passageway, the outlet passageway configured to fluidically couple the fuel filter cavity to a fuel outlet line; and
a regulator configured to be coupled to the fuel filter housing in fluid communication with the regulator passageway.

2. The apparatus of claim 1, wherein the first portion of the fuel filter housing includes an electrical connector configured to electrically couple a power source to the fuel pump.

3. The apparatus of claim 1, wherein the first portion of the fuel filter housing includes a seal configured to define a fluid-tight seal between the first portion of the fuel filter housing and the fuel tank when the flange is coupled to the fuel tank.

4. The apparatus of claim 1, wherein:
the second portion of the fuel filter housing defines a regulator cavity configured to receive a portion of the regulator.

5. The apparatus of claim 1, further comprising:
a coupling member configured to couple the regulator to the second portion of the fuel filter housing.

6. The apparatus of claim 1, wherein:
a portion of the side wall circumscribes the fuel filter cavity, a surface of the portion of the side wall defines an opening in fluid communication with the regulator passageway.

7. The apparatus of claim 1, wherein the portion of the centerline defined by the regulator passageway is nonparallel to the centerline defined by the fuel filter cavity.

8. The apparatus of claim 1, wherein a length of the regulator passageway is at least half a length of the fuel filter housing.

9. The apparatus of claim 1, wherein the cover includes a side surface configured to be disposed within the fuel filter cavity, the side surface defining a groove configured to receive a sealing member, the sealing member configured to fluidically isolate the cavity of the fuel filter housing from a volume outside of the fuel filter housing.

10. An apparatus, comprising:
a fuel filter housing having a first portion and a second portion, the first portion of the fuel filter housing including a flange configured to be coupled to a fuel tank such that a surface of the flange is outside of the fuel tank, the second portion of the fuel filter housing configured to be disposed within the fuel tank, the fuel filter housing defining a fuel filter cavity, a regulator passageway and a regulator cavity, the regulator cavity downstream of the fuel filter cavity, the fuel filter cavity configured to receive at least a portion of a fuel filter, a first surface of the fuel filter housing forming a first boundary of the fuel filter cavity, the first surface disposed at the first portion of the fuel filter housing, the first surface defining an opening in fluid communication with the regulator passageway, a second surface of the fuel filter housing forming a boundary of the regulator cavity, the second surface disposed at the second portion of the fuel filter housing, the second surface defining an opening in fluid communication with the regulator passageway such that a regulator can be coupled at least partially within the regulator cavity; and
a cover configured to be removably coupled to the first portion of the fuel filter housing, the cover defining an outlet passageway, the outlet passageway configured to fluidically couple the fuel filter cavity to a fuel outlet line.

11. The apparatus of claim 10, wherein the first surface is a substantially cylindrical surface.

12. The apparatus of claim 10, wherein a centerline defined by a portion of the regulator passageway is offset from a centerline defined by the fuel filter cavity.

13. The apparatus of claim 10, wherein a centerline of a portion of the regulator passageway is nonparallel to at least one of a centerline defined by the fuel filter cavity or a centerline defined by the regulator cavity.

14. The apparatus of claim 10, wherein a length of the regulator passageway is at least half a length of the fuel filter housing.

15. An apparatus, comprising:
a fuel filter housing defining a fuel filter cavity configured to receive a fuel filter, the fuel filter housing defining a regulator passageway in fluid communication with and downstream of the fuel filter cavity, a first portion of the fuel filter housing including a flange configured to be coupled to a fuel tank such that at least a surface of the flange is disposed outside of the fuel tank, a second portion of the fuel filter housing configured to be disposed within the fuel tank, the second portion including an inlet connector configured to fluidically couple the fuel filter cavity to a fuel pump, a surface of the fuel filter housing substantially circumscribing the fuel filter cavity, the surface of the fuel filter housing defining an opening in fluid communication with the regulator passageway, the surface of the fuel filter housing disposed at the first portion of the fuel filter housing, a length of the regulator passageway is at least half a length of the fuel filter housing;
a cover configured to be removably coupled to the first portion of the fuel filter housing, the cover defining an outlet passageway, the outlet passageway configured to fluidically couple the fuel filter cavity to a fuel outlet line; and
a regulator configured to be coupled to the fuel filter housing in fluid communication with the regulator passageway.

16. The apparatus of claim 15, wherein a centerline defined by a portion of the regulator passageway is offset from to a centerline defined by the fuel filter cavity.

17. The apparatus of claim 15, wherein a centerline defined by a portion of the regulator passageway is nonparallel to a centerline defined by the fuel filter cavity.

18. The apparatus of claim 15, wherein:
the surface of the fuel filter housing is a first surface; and
a second surface of the fuel filter housing defines a boundary of a regulator cavity, the second surface disposed at the second portion of the fuel filter housing, the second surface defining an opening in fluid communication with the regulator passageway.

19. The apparatus of claim 1, further comprising:
the fuel filter disposed within the fuel filter cavity.

20. The apparatus of claim 15, further comprising:
the fuel filter disposed within the fuel filter cavity.

* * * * *